S. P. Ruggles Sheet 1, 3 Sheets.

Printing Press.

No. 519. Reissued Jan. 19, 1858.

S. P. Ruggles. Sheet 2, 3 Sheets.

Printing Press.

No. 519. Reissued Jan. 19, 1858.

Sheet 3, 3 Sheets.
S. P. Ruggles.
Printing Press.
No. 519. Reissued Jan. 19, 1858.
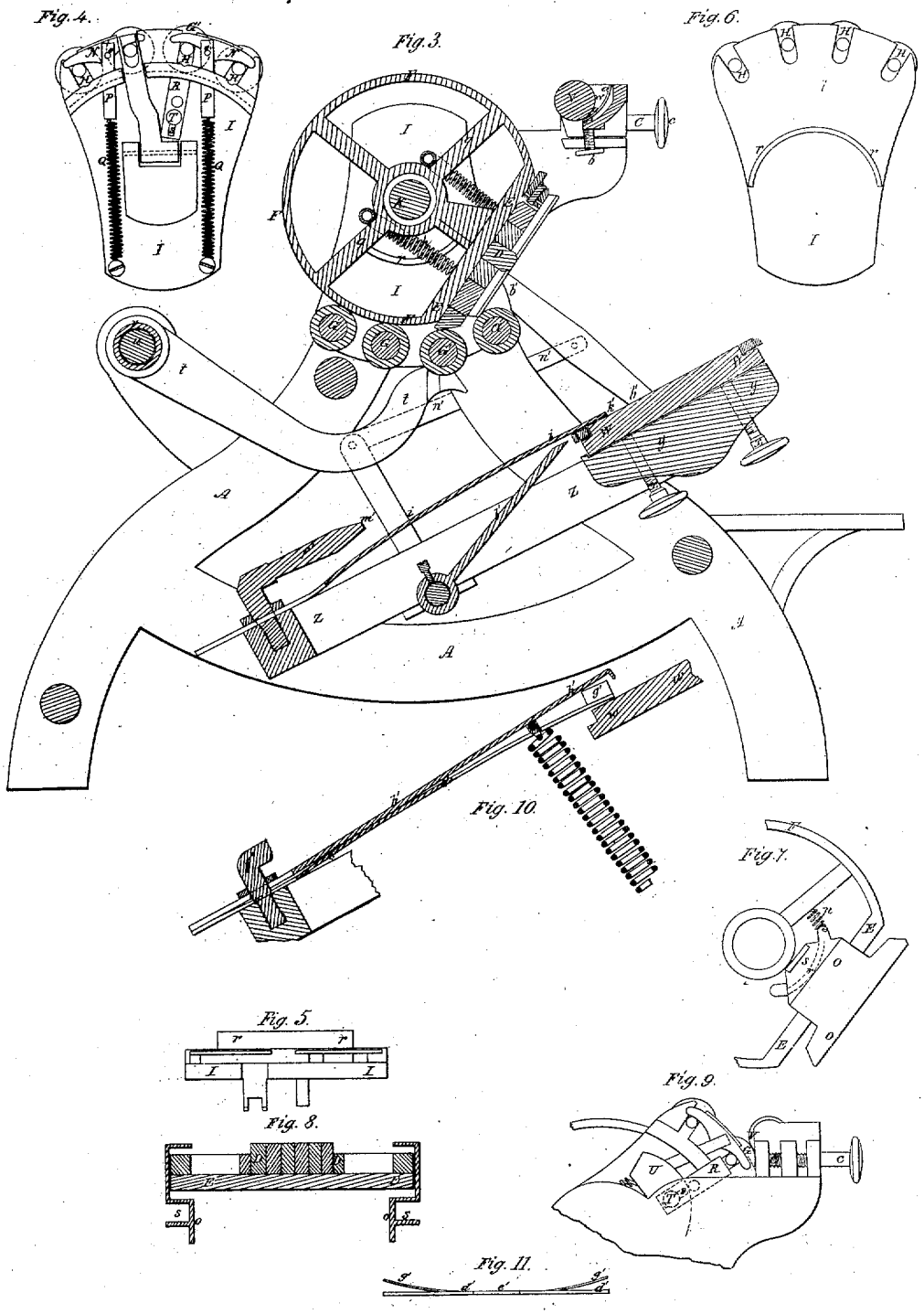

BEST AVAILABLE COPY

UNITED STATES PATENT OFFICE.

STEPHEN P. RUGGLES, OF BOSTON, MASSACHUSETTS.

IMPROVEMENT IN PRINTING-PRESSES.

Specification forming part of Letters Patent No. 7,878, dated January 1, 1851; Reissue No. 519, dated January 19, 1858.

*To all whom it may concern:*

Be it known that I, STEPHEN P. RUGGLES, of Boston, in the county of Suffolk and State of Massachusetts, have invented certain new and useful Improvements in Printing-Presses; and I do hereby declare that the following description, taken in connection with the accompanying drawings hereinafter referred to, forms a full and exact specification of the same, wherein I have set forth the nature and principles of my said improvements, by which my invention may be distinguished from others of a similar class, together with such parts as I claim and desire to have secured to me by Letters Patent.

Figure 1:
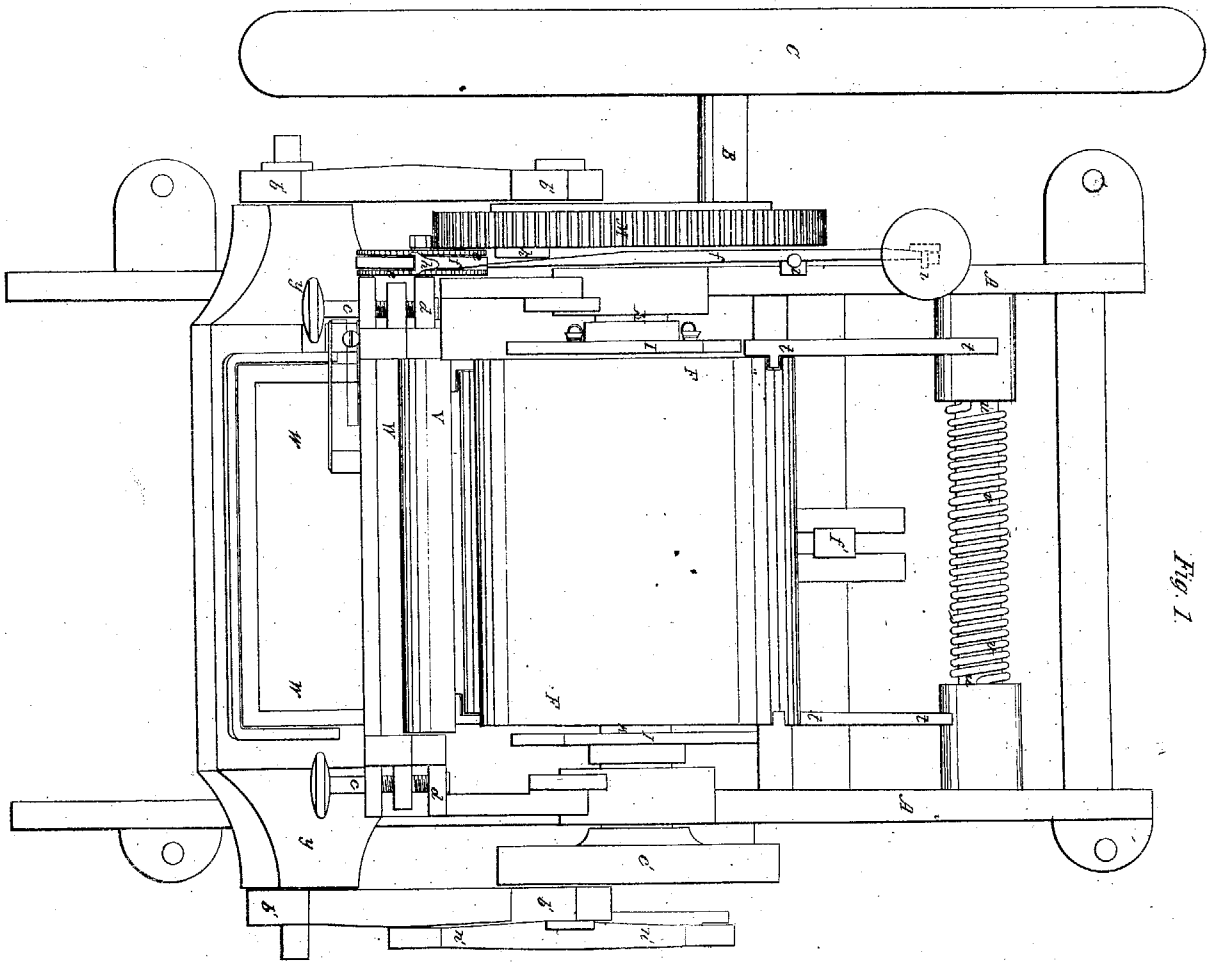
Figure 2:
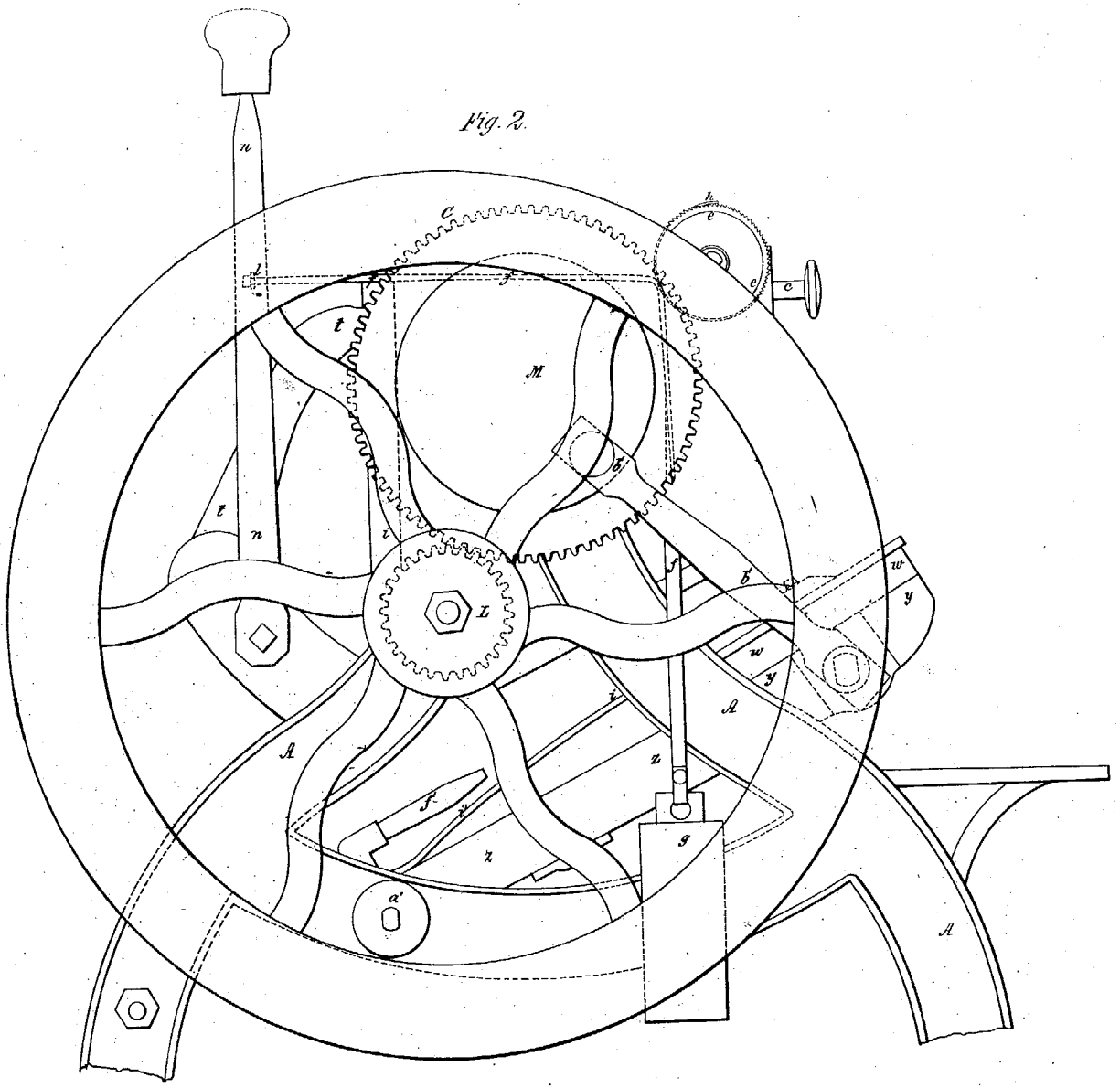

The figures of the accompanying plates of drawings represent my improvements. In Plate 1, Figure 1, is a plan of my improved process, and Fig. 2 is a side elevation of the same. In Plate 2, Fig. 3, is a central vertical section. Fig. 4 is a detail sectional view showing the mode of holding the journals of the inking-rollers. Fig. 5 is a detail plan of same. Fig. 6 is a detail side view of the same. Fig. 7 is a detail sectional view showing the apparatus for working the moving beams on the side of the form-bed, as hereinafter explained. Fig. 8 is another detail sectional view of the same and of the form-bed. Fig. 9 is a detail sectional view of the apparatus for raising one of the inking-rollers, so as to make it take the ink from the delivery-roll of the fountain. Fig. 10 is a detail sectional view of the platen and spring-holders, to be hereinafter explained; and Fig. 11 is a detail view of the peculiar gage which I use.

A A A A, &c., in the several drawings, is the frame-work of the press, which may be shaped as represented, or in any other way to sustain the operative parts of the machine.

B, Fig. 1, is the driving-shaft having a fly-wheel, C, to regulate its motions, and power is usually applied to this shaft by a treadle. D D, Figs. 3 and 8, Plate 2, is the form, which is secured to a stationary bed, E E, formed on the plane face of a segment of a cylinder, F F F, which is arranged so as to remain stationary while the inking-rollers revolve and move round it continuously, so as to effectually distribute the ink. The position of the bed E E may be as shown in Fig. 3, Plate 2, or more nearly vertical, if desired.

The inking apparatus consists of a series of rollers, G G G G′, Fig. 3, Plate 2, arranged side by side in the slotted boxes H H H H, &c., in each of the rotating cheek-plates I I I I, Figs. 3, 4, and 5, Plate 2, which plates are firmly connected to the revolving-shaft K K, which passes through the axis of the cylinder-segment F F F, and is driven by mean of a pinion, L, on the driving-shaft, which engages with a gear-wheel, M, on the end of said shaft K K. The journals of these inking-rollers are kept in their boxes, and yet allowed to move so as to permit said rollers to pass over the form, by means of the bent turning-buttons N N N, &c., which turn loosely on the pins O O O in the ends of the rods P P which rods are connected to the spinal springs Q Q arranged as shown in Fig. 4, so as to permit the desired play of said buttons. The journals of one of the inking-rollers G′ rest upon sliding bearers R R, which move up and down, and are guided by the slots S S and pins T T, Figs. 4 and 9, Plate 2. The sliding motion of these bearers is effected by means of a horizontal stud attached to the exterior of said bearers, which as the rollers turn round on the cylinder F F F come in contact with the stationary cams U U on the side frame-work, and press the roller G′ upward, so as to bring it in contact with the ink-delivering roll V V in the fountain W W after each passage of the rolls over the form. The raising of this roll G′ from the distributing cylinder F F F enables it to take the ink from the delivery-roll, and leaves said roll G′ free to turn and take the layer of ink from the delivery-roll of the full width which it is permitted to give out. The delivery-roller V V is scored transversely, in the way now commonly practiced by me, and has combined with it an adjustable scraper, *a a*, regulated by the screws *b b*, &c., so as to deliver a thin film or sheet of ink to the roller G′. The fountain W W and roller V V may be moved horizontally toward the distributing-cylinder by means of the stationary screws *c c*, operating with the nut-plates *d d*, attached to said fountain in a manner which will be readily understood by inspection of Fig. 1, Plate 1.

The delivering of the ink from the fountain or the turning of the delivering-roll V V is regulated or varied by the following arrangement or combination of the mechanical devices: On the journal of said delivering-roll a grooved ratchet-wheel, *e e*, Figs. 1 and 2, Plate 1, is firmly fastened, having teeth on each side of the groove. A band, *f f*, passes under and over this wheel, and has a weight, *g*, attached to its lower end, and pawl *h*, secured to that part which passes over said wheel, which pawl engages with the teeth of the ratchet-wheel, as shown in said figures. Near its other end said band is attached to the top of a lever-stud, *i*, which is moved by a roll, *k*, fastened to the inner face of the gear-wheel M, before referred to. The extreme end of said band passes through a staple, *l*, on the side of the stop-lever *n n*, the band having a proper stop on its end which engages or abuts against the staple *l* of the stop-lever. The said stop-lever *n n* and the lever-stud *i* have proper fulcra on the frame-work, and by pushing the former forward or backward the weight *g* will pull the pawl *h* over a lesser or greater number of teeth on the ratchet-wheel *e e*, and the lever-stud *i*, operated by the roll *k* on the gear-wheel M, will turn said wheel and the delivering-roll correspondingly, the stop on the end of the band *f f*, which engages with the staple *l* of the stop-lever, arresting the descent of the weight *g*, and consequently at each revolution of the inking apparatus regulating the take-up of the pawl on the ratchet-wheel *e e*.

In order to prevent the ink from getting on the tympan at each impression, I make the bearers so as to move in when the impression is being produced, and out when the inking-rollers are passing over the form. This is effected by making said bearers of the shape shown at O O O in Figs. 3, 7, and 8, Plate 2, and arranging them so as to slide forward and back, the backward motion being accomplished by the spiral springs *p p p p*, which pass from one bearer to the other around the arms *q q* of the distributing-cylinder, and the forward motion being produced by the cam-ledges *r r*, Fig. 6, on the revolving check-plates I I, which play in the grooves *s s* of said bearers and press them out at the proper time to sustain the inking-rollers when they pass over the form.

By the use of a stationary distributing-cylinder, as above described, the inking-rollers have a continuous rotary motion, in lieu of a reciprocating motion as is usual in presses, by which improvement much time and power is saved. The said cylinder is held in position by means of the bent levers or dogs *t t t t*, which project from each end of the shaft *u u*, on which they turn, each being attached to the end of a spiral spring, *v v*, which operates so as to turn them always to one position when they have been moved from the same. The ends of the dogs *t t t t* have proper studs, which engage with slots on the side of the distributing-cylinder, and the check-plates I I, in revolving, throw each of said levers out of connection with said cylinder alternately, so as to let the inking-rollers pass round and always keep in contact with said cylinder. By these means the bed E remains stationary while the rolls G are carried over the form by means of the revolving check plates I I.

It only remains for me now to describe the platen and the mode of operating the same, together with the means used for holding the paper down on the same. The platen W W, Figs. 1 and 2, Plate 1, and Fig. 3, Plate 2, is arranged so as to be adjustable by means of the screws *x x x x* in the plate *y y* of the vibrating frame *y y z z*, which frame turns on the shaft *a'*, having proper bearings in the frame-work, and is hung by means of the connecting-arms *b' b' b' b'* to the eccentric points on the exterior faces of the revolving circular plate *c'* and the gear-wheel M, both of which are fixed to the revolving shaft K K. The revolutions of the said plate *c'* and wheel M, it will be seen, will cause the platen to vibrate or move alternately to the form to get an impression and from the same to get a new sheet or card, the lowest inclined position which it takes being the most convenient for placing the sheet. A gage-plate, *d'*, extending across the end of an arm, *e' e'*, (secured by the screw-clamp at *f'* to the vibrating frame *y y z z*,) has diverging springs *g' g'*, Fig. 11, secured to its upper side, which catch the edge of the sheet, and a spring-holder, *h' h'*, secured by the same clamp to the vibrating frame directly over said gageforms with the vibrating platen, a pair of nippers, as it were, to hold the sheet firmly against the tympan (supported by the platen-plate) so as to disengage it from the form.

In printing cards I use a gage-bar, *i i*, with a projecting lip, *k'*, under which the card slides, the arm of which bar is secured by the screw-clamp *f'* to the vibrating frame, so as to move up to the form with the platen; but when the platen is receding the under side of the arm *i i* abuts against a finger, *l'*, on the crank *m'*, which allows the platen to open or descend from it and let the card which has been printed slip down into a proper receptacle beneath the press. The crank *m'* is then turned by means of the arms *n' n'*, which connect said crank with one of the connecting-arms *b' b'*, before referred to, and by so turning said crank the finger *l'* is moved downward and permits the descent of the gage-bar *i i* against the platen so as to receive another card.

Having thus described my improvements in printing-presses, I shall state my claim, as follows:

What I claim as my invention, and desire to have secured to me by Letters Patent, is—

1. The gage-bar for cards, hereinabove referred to, in combination with the vibrating platen and stop-finger and crank which operates the same, in the manner and for the purpose hereinabove described.

2. The use of a segment of a cylinder in combination with the stationary form-bed, so that the rotary inking apparatus may move over the form and then after taking ink from the fountain distribute it on said cylinder, as hereinabove set forth.

3. In combination with the stationary form-bed, the revolving cheek-plates I I, for carrying the rolls over the form, as set forth and described.

4. The movable bearers on the side of the form-bed, arranged and operated substantially as hereinabove described, so as to be moved outward when the inking-rollers are passing over the form and drawn inward when the sheet or tympan is moved up to said form.

5. Regulating the delivery of the ink by combining with the delivery-roller a grooved ratchet-wheel and weighted pawl-band, operating with the lever-stud, cam-roller, and stop-lever, substantially as hereinabove specified.

6. Supporting the journals of one of the inking rollers on sliding-bearers so that it may be moved up against the delivering-roll by means of studs on said bearers and cams, operating the same as hereinabove set forth.

STEPHEN P. RUGGLES.

Witnesses:
F. O. PRINCE,
S. A. BARKER.